United States Patent

Platzer, Jr.

[15] 3,700,923

[45] Oct. 24, 1972

[54] SOLID STATE RELAY ARRANGEMENT

[72] Inventor: George E. Platzer, Jr., 30720 Woodgate, Southfield, Mich. 48076

[22] Filed: Dec. 22, 1969

[21] Appl. No.: 886,864

[52] U.S. Cl. .........307/252 B, 307/252 UA, 307/305
[51] Int. Cl. .............................................H03k 17/00
[58] Field of Search........307/252.21 B, 305, 252 UA

[56] References Cited

UNITED STATES PATENTS

| | | | |
|---|---|---|---|
| 3,320,518 | 5/1967 | Weiss | 307/252 |
| 3,392,626 | 7/1968 | Miller | 307/252 |
| 3,418,489 | 12/1968 | Platzer | 307/252 |
| 3,509,382 | 4/1970 | Zgebyra | 307/305 |

*Primary Examiner*—Rudolph V. Rolinec
*Assistant Examiner*—David M. Carter

[57] ABSTRACT

A Triac connected in series circuit with an alternating current electrical load has its gate electrode connected to a secondary winding of a transformer the primary winding of which is connected to a source of alternating electrical current; when a related control switch is closed the primary winding causes an induced voltage in the secondary winding which is out of electrical phase with the source; the induced voltage is then sufficient to develop a triggering current, at least equal to the gate threshold current, which is applied to the gate electrode as the potential across the Triac swings through a zero potential.

8 Claims, 3 Drawing Figures

PATENTED OCT 24 1972　　3,700,923

INVENTOR.
George E. Platzer, Jr.
BY

SOLID STATE RELAY ARRANGEMENT

BACKGROUND OF THE INVENTION

In the past mechanical type electrical relays have been employed. Such relays were usually constructed of a field coil, an armature responsive to the energization of such a coil and a suitable set of mechanically actuated electrical contacts. As has been generally well known to those skilled in the art, such relays of the prior art have many disadvantages. Some of these, for example, are the accumulation of dirt on the moving parts, pitting of the electrical contacts, electrical arcing and, often, some slowness in the response time of overall relay assembly.

Solid state relay systems have been proposed by the prior art; however, such have not been widely accepted because they are often too costly for general application and often include and require rectifying bridges which only further add to the cost of such prior art relay devices.

Accordingly, the invention as herein disclosed and described is primarily concerned with the solution of the above as well as other related problems.

SUMMARY OF THE INVENTION

According to the invention, a solid state relay arrangement for an electrical circuit employing a source of alternating electrical potential for developing an alternating current, comprises a gated solid state switching means for controlling the opening and closing of circuit means containing a related alternating current electrical load, transformer means including at least one primary winding and at least one secondary winding, said primary winding being adapted for connection to said source, said secondary winding being electrically connected to one terminal and the gate electrode of said solid state switching means, and additional control switch means for at times applying an alternating current flow from said source of electrical current to said primary winding in order to in accordance therewith develop a flux field and induce a voltage and current flow in said secondary winding, said induced voltage in said secondary winding being effective to apply a triggering current to said gate electrode of sufficient magnitude to place said solid state switching means in a conductive state thereby closing said circuit means.

Various general and specific objects and advantages of the invention will become apparent when reference is made to the following detailed description considered in conjunction with the accompanying drawings.

DESCRIPTION OF THE DRAWINGS

In the drawings, wherein for purposes of clarity certain details and elements may be omitted from are views.

DESCRIPTION OF THE PREFERRED EMBODIMENTS

Figure 1:
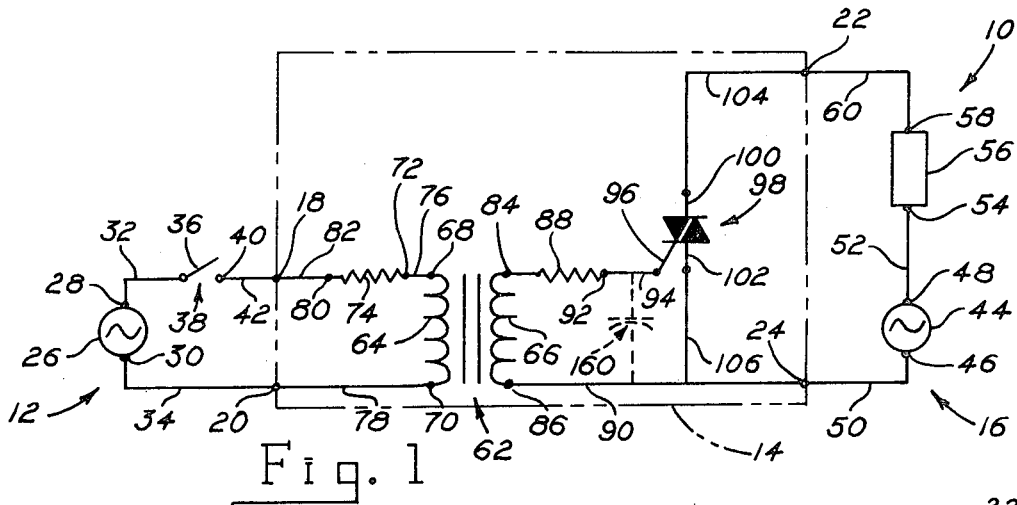
FIG. 1 is a schematic wiring diagram embodying a first embodiment of the invention.

Referring now in greater detail to the drawings, FIG. 1 illustrates an overall electrical circuit 10 comprised basically of three sub-circuits 12, 14 and 16 which may be operationally connected to each other, if desired, as by suitable connectors schematically illustrated at 18, 20, 22 and 24.

Circuit 12 is comprised of a suitable source 26 of alternating electrical potential, for developing an alternating current, having its output terminals 28 and 30 respectively connected to conductors 32 and 34 leading to a normally open switch member 36, of a switch assembly 38, and connector 20. The fixed contact 40 of switch assembly 38 is connected to connector 20 as by a conductor 42.

Circuit 16 may be comprised of a suitable source 44 of alternating current having its output terminals 46 and 48 respectively connected to conductors 50 and 52 which, in turn, lead to connector 24 and one terminal 54 of an associated electrical load 56. The other terminal 58 of load 56 is connected to connector 22 via electrical conductor 60. For purposes of disclosure, sources 26 and 44 are illustrated as being separate; however, especially as the description thereof progresses, it should be apparent that such sources 26 and 44 may in fact be the same single source of alternating current.

Circuit 14 is comprised of a transformer 62 having a primary winding 64 and a secondary winding 66 with terminals 68 and 70 of primary winding 64 being respectively connected to terminal 72 of a resistor 74 and connector 20 via conductors 76 and 78. The other terminal 80 of resistor 74 is connected to connector 18 by means of a conductor 82.

Terminals 84 and 86 of secondary winding 66 are respectively connected to one end of a resistor 88 and to a conductor 90 leading to connector 24. The other end or terminal 92 of resistor 88 is electrically connected, via conductor 94, to the gate electrode 96 of a Triac 98. The other terminals 100 and 102 of Triac 98 are respectively connected to conductors 104 and 106 which lead to connector 22 and conductor 90. Generally, a Triac can be described as consisting of an N-P-N-P switch in parallel with a P-N-P-N switch formed in a single silicon crystal. The action of a Triac is somewhat similar to two parallel and oppositely poled silicon controlled rectifiers. Generally, in order to achieve conduction through the Triac 98, there must be a voltage applied across terminals 100 and 102 and a control current at the control electrode or gate 96.

Ideally, most of the voltage drop in the circuit 12 is across the primary resistor 74 rather than across the primary winding 64 of transformer 62 in order to thereby assure that the current in the primary winding 64 will be in phase with the voltage of A.C. source 26. Therefore, by application of Lenz's Law, it becomes apparent that voltage induced in the secondary winding 66 will be 90° out of phase with the A.C. voltage of source 26. Of course, sources 26 and 44 are in phase with each other especially when, as previously mentioned, separately indicated sources 26 and 44 may be replaced by a single A.C. source.

Resistor 88, in the gate circuit of the Triac 98, is employed to establish a limit to the gate current. For purposes of example, let it be assumed that Triac 98 has a required gate trigger current of 25.0 milliamperes and that the transformer 62 has a 1:1 turn ratio with a 10.0 volt peak output. If now the A.C. source or supply is rated at 120.0 volts (R.M.S.) the peak voltage value will be:

$$(120.0 \text{ volts}) \cdot (1.414) = 170.0 \text{ volts}$$

If the system is now designed for a peak current of 50.0 milliamperes, the gate current of Triac 98 will be above the 25.0 milliampere threshold value for about 45° on either side of zero value for the supply voltage from the A.C. source.

With the above, the value of the primary resistor 74 can be determined as follows:

$$(170 - 10) \text{ volts}/50 \times 10^{-3} \text{ amps.} = 3,400.0 \text{ ohms},$$

while the value of the resistor 88 in the gate circuit can be determined in the following manner:

$$10.0 \text{ volt}/50 \times 10^{-3} \text{ amp.} = 200.0 \text{ ohms}$$

This, of course, assumes that the resistance of gate 96 is negligible.

The primary reason for providing a broad overlap of gate trigger current about the zero value of A.C. supply voltage, is to assure that there will be adequate gate current to make the Triac 98 conductive even for loads which are not purely resistive. If the load should be characterized by an impedance, its current, as depicted by curve 108 of FIG. 3, will either lead or lag the A.C. supply voltage as illustrated by curve 110 of FIG. 3.

OPERATION OF THE INVENTION

In considering the operation of the invention, reference will be made to both FIGS. 1 and 3. Accordingly, when switch member 36 is closed, the current through primary winding 64 may be considered to have a characteristic sine curve substantially in phase with the supply voltage as illustrated by curve 110 of FIG. 3. (Since the sources 26 and 44, if separate sources are employed, will have substantially in phase output voltages, curve 110 can be considered as depicting either or both of such output voltages of such sources 26 and 44.) Such voltage applied to terminals 18 and 20, as is well known, will develop a secondary voltage, generally depicted by curve 112 in FIG. 3, in the transformer secondary winding 66. Further, since the secondary winding voltage and current will be in phase with each other, curve 112 can be considered as representing either the secondary current flow or the secondary voltage.

If a vertical line 114 is drawn through the intersection of the A.C. supply or source voltage curve 110 with the horizontal axis or "O"-line, such line when extended upwardly will intersect the maximum point (or very nearly thereto) of the transformer secondary winding voltage curve 112 as at 116. Similarly, if a second vertical line 118 is drawn through the intersection of the secondary winding voltage curve 112 with the horizontal axis or "O"-line, such line when extended downwardly will intersect the maximum point (or very nearly thereto) of the supply voltage curve 110 as at 120. The distance, D, between such lines 114 and 118 is the phase shift between curves 110 and 112 which, in this case, is illustrated as being a 90° phase shift.

If curve 112 is thought of as being the secondary winding voltage curve, then each of the relatively short-dash horizontal lines 112 and 124 respectively intersecting curve 112, as at 126, 128 and 130, 132, depicts that particular magnitude or value of voltage (sometimes referred to as threshold voltage) which will, through resistor 88, develop the required threshold current (which, for purposes of illustration has been previously assumed to be 25.0 milliamperes). Of course, if curve 112 is thought of as being the current in the Triac gate circuit, then such dash-lines 112 and 124 would represent the minimum or threshold current.

As can be seen, the invention provides, in effect, a current signal, to the gate 96 of Triac 98, equal to or greater than the threshold current value for a span of time measured horizontally as from point 126 to point 128, during the first half cycle and horizontally as from point 130 to point 132 during the second half of the cycle. If for ease of reference, these are referred to as threshold or triggering current pulses, then it can be seen that a very wide band triggering pulse is automatically developed by the A.C. source during each half of the cycle and that the width of such triggering pulses accommodates an extremely wide phase shift as might exist between curves 108 and 110 as might occur depending upon the degree of reactance within the load 56.

Figure 3:
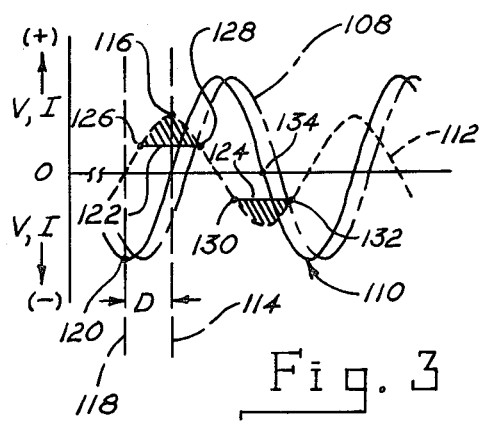
FIG. 3 is a graph illustrating, among other things, the phase relationship of the currents and voltages involved in the circuitry of either FIG. 1 or FIG. 2.

In view of the preceding, it can be seen that as the current from the A.C. source through terminals 100 and 102 of Triac 98 (represented by curve 110) passes through the "O" value of FIG. 3, the secondary winding developed voltage and resulting current has already increased to a maximum value as at point 116 of curve 112. Accordingly, the conditions for causing the Triac 98 to become conductive are fulfilled. That is, a sufficient triggering current, equal to or in excess of the gate threshold current, has been applied to the Triac gate 96 at the time that a zero potential exists across the Triac terminals 100 and 102, and has remained applied until the potential across the Triac has increased to the point where the Triac can switch on.

The characteristic of a Triac is such as to remain conductive even after termination of the triggering current to the Triac gate; such conduction will also terminate when the Triac terminals 100 and 102 once again reach a zero potential. However, as can be seen in FIG. 3, the pulse or triggering current is again automatically established at point 130 before the voltage (represented by curve 110) across Triac terminals 100 and 102 again becomes zero potential as represented by intersection point 134.

Therefore, it can be seen that once switch 36 is closed, Triac 98 becomes conductive and remains conductive until such time as switch 36 is again opened. Whenever, Triac 98 becomes conductive, the electrical load 56, of course, becomes energized. Accordingly, it should be apparent that the invention of FIG. 1 in effect discloses a solid state type of electrical relay which would be classified as being normally closed.

Figure 2:
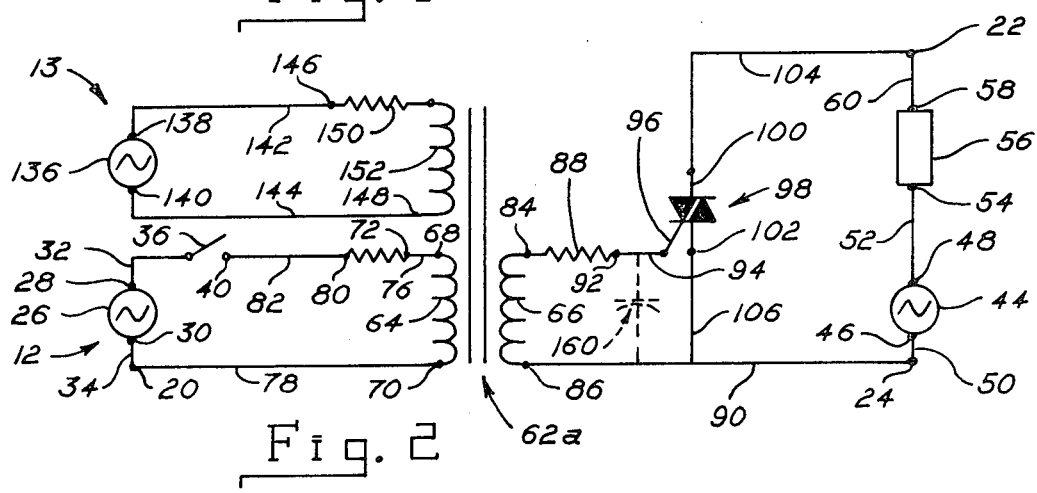
FIG. 2 is a schematic wiring diagram of a second embodiment of the invention.

FIG. 2 illustrates a second embodiment of the invention which might be classified as being a normally open solid state relay. All elements in FIG. 2 WHICH are like or similar to those of FIG. 1 are identified with like reference numbers.

From a comparison of FIGS. 1 and 2, it can be seen that the basic difference therebetween resides in the provision of a circuit 13, in FIG. 2, comprised of a source 136 of A.C. current having its output terminals 138 and 140 respectively connected via conductors 142 and 144 to terminals 146 and 148 of a resistor 150 and a second primary winding 152. The resistor 150 and primary winding 152 may then be connected to each other as at a common terminal 154.

The operation of the embodiment of FIG. 2 is as explained with reference to FIG. 1. However, the transformer 62a now has a second primary winding 152, connected so as to produce a flux opposing that produced by 64. Accordingly, whenever switch 36 is open, the closed circuit 13 is effective to induce current flow into the secondary winding 66 in the manner described with reference to primary winding 64 of FIG. 1 thereby causing the Triac 98 to be in a continuously conductive state resulting in energization of load 56. However, because of the opposing flux produced by primary windings 152 and 64, whenever switch member 36 is closed, the current flow through primary winding 64 effectively cancels the effect of the current flow through primary winding 152 which results, of course, in no induced voltage in secondary winding 66 causing an absence of a triggering current at gate 96 thereby rendering Triac 98 non-conductive and de-energizing load 56. As in the case of the embodiment of FIG. 1, the sources of A.C. current 26, 44 and 136 may in fact comprise a single source of A.C. current which, in view of the preceding description, should be apparent to those skilled in the art.

Both FIGS. 1 and 2 illustrate, in phantom line, a capacitor 160 situated so as to have one side thereof connected to conductor 94 and its other side connected to conductor 90. Such a capacitor, as well as other devices which should be apparent to those skilled in the art is employed to prevent the occurrence of spurious "turn-on" signals to the Triac gate 96 arising out of possible voltage transients in the associated circuitry.

In FIG. 2, circuit 13 has been illustrated as being a totally closed circuit, however, it should be apparent that a switch such as 36 could be placed within the circuitry of circuit 13. By adding such a switch, a single device as shown by FIG. 2 could then be employed in any situation regardless of whether a normally open or a normally closed relay was desired. If a normally closed relay was desired, such switch placed within circuit 13 would be closed and permitted to remain closed while switch 36 of circuit 12 would be employed for causing the relay to become opened at selected periods of operation. If, however, a normally open relay was desired, such a switch placed in circuit 13 would be permitted to remain open and the closing of the relay would be accomplished by the closing of switch 36 within circuit 12.

Although only a select number of embodiments of the invention have been disclosed and described it is apparent that other embodiments and modifications of the invention are possible within the scope of the appended claims.

I claim:

1. A solid state relay arrangement for an electrical circuit employing a source of alternating electrical potential effective for producing an alternating electrical current, comprising gated solid state switching means for controlling the opening and closing of circuit means containing a related alternating current electrical load, transformer means including primary winding means and secondary winding means, said secondary winding means being electrically connected to one terminal and the gate electrode of said solid state switching means, said secondary winding means being adapted to have induced therein an induced voltage, said induced voltage being effective to develop and apply a triggering current to said gate electrode of sufficient magnitude to place said solid state switching means in a conductive state thereby closing said circuit means through said load, and said primary winding means being adapted to be energized by said source for creating a flux field for inducing said induced voltage in said secondary winding means.

2. A solid state relay arrangement according to claim 1 wherein said gated solid state switching means comprises a Triac having said one terminal and a second terminal serially in said circuit means containing said related electrical load.

3. A solid state relay arrangement according to claim 1, wherein said primary winding means comprises at least one primary winding of said transformer means, and wherein said secondary winding means comprises at least one secondary winding of said transformer means.

4. A solid state relay arrangement according to claim 1, wherein said primary winding means comprises at least first and second primary windings, said first and second primary windings being effective to respectively produce upon energization by said source first and second flux fields in opposition to each other so as to result in no production of an induced voltage in said secondary winding means whenever said first and second flux fields are in coexistance.

5. A solid state relay arrangement according to claim 1, including control switch means effective to selectively open and close an electrical circuit between said primary winding means and said source.

6. A solid state relay arrangement according to claim 4, including control switch means in circuit with at least one of said first and second primary windings, said control switch means being effective to at times open said circuit and said one of said primary windings in order to eliminate one of said flux fields and permit the other of said flux fields to induce said induced voltage in said secondary winding.

7. A solid state relay arrangement according to claim 4, wherein said first primary winding is adapted to be placed in closed circuit with said source, and wherein said second primary winding is adapted to be selectively placed in closed circuit with said source, and control switch means electrically connected between said source and said second primary winding for effecting said selective placement of said second primary winding in said closed circuit with said source.

8. A solid state relay arrangement according to claim 1, including capacitor means electrically connected to and in parallel with said secondary winding means.

* * * * *